UNITED STATES PATENT OFFICE.

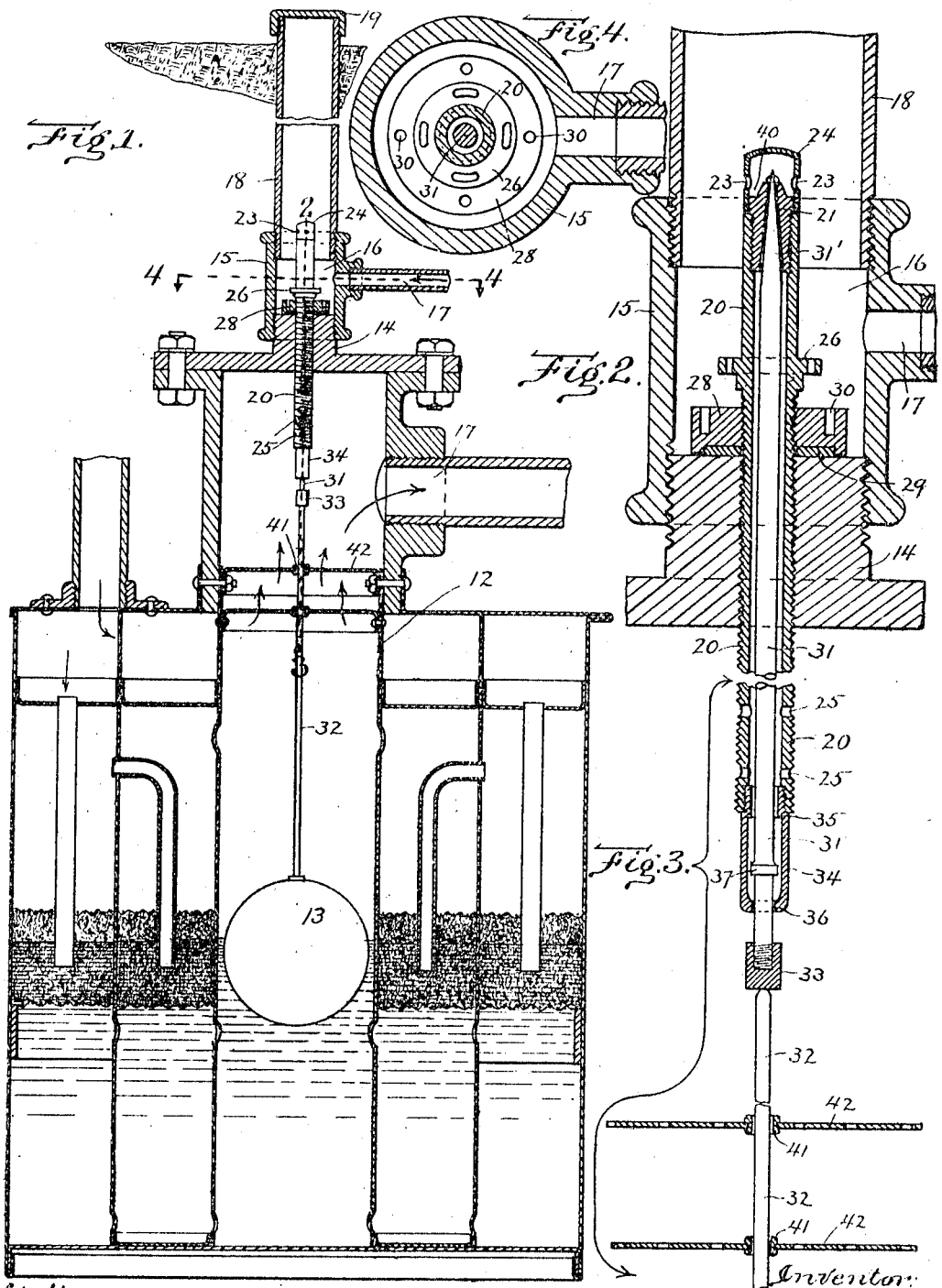

MONROE D. COLBATH, OF HAMPDEN, MAINE.

AUTOMATIC VALVE FOR CARBURETERS, &c.

954,258.

Specification of Letters Patent.   Patented Apr. 5, 1910.

Application filed June 11, 1909. Serial No. 501,647.

*To all whom it may concern:*

Be it known that I, MONROE D. COLBATH, of Hampden, in the county of Penobscot and State of Maine, have invented certain new and useful Improvements in Automatic Valves for Carbureters, &c., of which the following is a specification.

This invention relates to a reservoir located below the surface of the ground and adapted to contain a volatile liquid, such as gasolene, the reservoir being, in this embodiment of my invention, a part of a carbureter, and provided with a float which rises and falls with the liquid contained therein, and automatically closes a valve which controls the admission of liquid to the reservoir when the liquid rises to the predetermined level.

The invention has for its object, first, to provide convenient and practical means for removably connecting the valve and its seat with the reservoir in such manner that said parts may be conveniently removed and replaced by appliances operated from above, and may be adjusted by the same appliances to vary the height of the valve seat, and therefore the high liquid level in the reservoir.

The invention also has for its object to provide a settling chamber above the reservoir and adjacent to the valve seat, whereby foreign matter contained in the liquid may be accumulated below the valve seat and prevented from obstructing the latter and interfering with the proper closing of the valve.

The invention consists in the improvements which I will now proceed to describe and claim.

Of the accompanying drawings, forming a part of this specification,—Figure 1 represents a vertical sectional view of a subterranean reservoir showing partly in elevation and partly in section the preferred construction embodying my invention. Fig. 2 represents a section on line 2—2 of Fig. 1. Fig. 3 represents a section on line 3—3 of Fig. 1. Fig. 4 represents a section on line 4—4 of Fig. 1, and a plan view of the parts below said line.

The same reference characters indicate the same parts in all the figures.

In the drawings,—12 represents a reservoir adapted to contain gasolene, and to be buried below the surface of the ground, the reservoir here shown being the float-containing chamber of a carbureter constructed substantially as shown in my application for Letters Patent of the United States, Serial No. 446,267, filed July 31, 1908.

13 represents a float, preferably of spherical form, which is movable vertically in the reservoir 12 by the rise and fall of the liquid therein.

14 represents a head located above the reservoir and secured thereto in any suitable way, the head, as here shown, bearing on and being secured to the top of the reservoir.

15 represents a casing having a screw thread or other suitable connection with the head 14, and projecting above the same, the head and casing forming a receiving chamber 16 which is located above the reservoir, and is provided with a liquid inlet 17 communicating with an elevated source of liquid supply, through which liquid flows under suitable head or pressure into the receiving chamber.

18 represents a tube or sleeve engaged with the upper end of the casing 15 and extending upwardly therefrom to the surface of the ground, and provided at its upper end with a removable air-tight cap or closure 19, the sleeve 18 constituting an extension of the receiving chamber.

20 represents a liquid-conducting tube which passes through an orifice formed for its reception in the head 14, the upper end of the tube being located in the receiving chamber and its lower end in the reservoir. The tube is provided with a tapered valve seat 21 at its upper end portion. The valve seat 21 is in communication with the receiving chamber 16, preferably through inlet openings 23 formed in a cap 24 attached to the tube 20, said inlet openings being located above the valve seat. The tube 20 has a liquid-tight connection with the head 14, so that the only passage for liquid from the receiving chamber 16 to the reservoir is through the tube 20, the latter being provided at its lower end portion with outlet openings 25 discharging into the reservoir. The tube 20 is removably and adjustably connected with the head 14, preferably by means of an external screw thread formed on the tube, and an internal thread formed in the orifice through the head. The tube may therefore be inserted and removed by rotating it to screw it into and unscrew it from the head, the tube being provided with means for engaging a wrench adapted to be operated from a point above the ground and through the sleeve 18. As here shown, the tube is provided with an enlargement or collar 26 having slots or recesses 27 adapted to receive prongs on a suitable wrench of tubular form adapted to surround the upper portion of the tube, said wrench being provided with a suitable elongated shank, so that it may be operated from an elevated point.

28 represents a lock nut engaged with the upper threaded portion of the tube 20, and adapted to bear on the upper end of the head 14, a compressible washer or gasket 29 being preferably interposed between the nut and the head, and adapted to form a liquid-tight joint when the nut is turned down against the head. The nut is adapted to be operated from an elevated point by a suitable wrench, and may be provided with orifices 30 adapted to receive prongs or pins on the wrench.

31 represents a spindle which is movable endwise in the tube 20, its upper end portion 31', being tapered or frusto-conical, and constituting a needle valve adapted to close on the seat 21. The lower end of the spindle projects below the lower end of the tube 20, and is adapted to engage the float 13, there being no positive connection between the spindle and float, so that the spindle may be removed with the tube 20 while the float remains in the reservoir. The float is preferably provided with an upwardly projecting stem 32 adapted to bear on the lower end of the spindle, or, as here shown, on a weight 33 attached to the lower end of the spindle, said weight insuring a prompt downward movement of the spindle by gravitation when the float descends. Means are provided for limiting the downward movement of the spindle, said means as here shown, comprising a sleeve 34 engaged with the lower end of the tube 20, and having internal shoulders 35 and 36 constituting stops which coöperate with an enlargement 37 on the spindle, the lower stop 36 limiting the downward movement of the spindle.

It will be seen that the valve seat 21 and the valve-carrying spindle 31 may be withdrawn from the head 14 for the purpose of inspecting and renewing any of the said removable parts, particularly the valve and its seat. It will also be seen that the tube and valve seat may be adjusted to any desired height for the purpose of adjusting the high liquid level in the reservoir.

The receiving chamber 16 having a lateral inlet, not only permits the removal and adjustment of the tube 20, as above described, but also constitutes a settling chamber, its lower portion being located below the liquid inlet 17 and below the inlets 23 through which the liquid passes to the valve seat, so that foreign matter in the liquid entering the chamber is deposited therein below the valve seat, and prevented from passing with the liquid to the valve seat and interfering with the action of the valve. The inlets 23 are preferably located above the upper end of the terminal member 22 in which the valve seat is formed, so that a second settling chamber 40 is formed within the lower portion of the cap 24. Said cap, in addition to forming a settling chamber, as stated, protects the projecting end of the valve 31 from injury by the wrench introduced for the purpose of rotating the tube 20 or the lock nut 28.

It is obvious that the tube 20 may be extended upwardly through the sleeve 18, so that its upper end may be engaged by a wrench at or near the upper end of the sleeve. The wrench which engages the nut lock 28 should have a tubular shank of greater internal diameter than the tube 20, so that it may receive the upper portion of said tube when engaged with the lock nut.

The float stem 32 is movable in fixed guides 41 rigidly connected with the wall of the reservoir 12 by suitable means such as radial arms, or if desired, by perforated sheet metal disks 42, which may serve as distributers for the gasolene flowing from the tube 20, the gas or carbureted air passing upwardly through the perforations in said plates on its way to the gas outlet 43. The guides 41 may be orifices formed at the center of said disks, and are arranged to keep the float stem in alinement with the spindle.

I claim:

1. In combination, a liquid reservoir provided with a vertically movable float, a receiving chamber located above the reservoir and provided with a liquid inlet, a vertical liquid-conducting tube removably connected with the bottom of the chamber and connecting the chamber with the reservoir, said tube having a valve seat, and a valve-carrying spindle movable in the tube and controlled by the float, the spindle being separable from the float, removable with the tube, and removable with the tube and valve seat.

2. In combination, a liquid reservoir provided with a vertically movable float, a receiving chamber located above the reservoir and provided with a liquid inlet, the bottom of said chamber being formed by a head between the reservoir and chamber, a vertical liquid-conducting tube having a screw thread section with said head and connecting the chamber with the reservoir, said tube having a valve seat and an adjustable lock nut adapted to coöperate with the upper surface of the head in forming a liquid-tight joint, a valve-carrying spindle movable in the tube and controlled by the float, and a sleeve extending upwardly from the chamber and provided with a removable closure at its upper end, the said lock nut being rotatable by a wrench introduced through said sleeve.

3. In combination, a liquid reservoir having a float, a liquid-receiving chamber above the reservoir, a liquid-conducting tube passing through the bottom of the chamber and connecting the chamber with the reservoir, said tube having a valve seat, and a valve-carrying spindle movable relatively to said tube and projecting below the latter, the tube and spindle being removable, and the float being separable from the spindle.

4. In combination, a liquid reservoir having a float, a liquid-receiving chamber above the reservoir, a liquid-conducting tube connecting the chamber with the reservoir, and having a valve seat, and a valve arranged to coöperate with said valve seat, the valve and tube having complemental means for limiting the downward movement of the spindle, and the float being separable from the spindle.

5. In combination, a liquid reservoir, a liquid-receiving chamber above the reservoir, a liquid-conducting tube removably engaged with the bottom of the chamber and connecting the chamber with the reservoir, said tube having a valve seat, a valve extending into said tube and projecting below the latter, a float movable in the reservoir and unattached to the valve and having a stem arranged to engage said valve, and means for guiding the said stem.

6. In combination, a liquid reservoir having a float, a liquid-conducting tube communicating with the reservoir and having a valve-seat, and a valve unattached to the float and having a limited movement, arranged to coöperate with said seat, and projecting below the latter, the spindle being weighted to cause it to follow the downward movements of the float.

7. In combination, a liquid reservoir, a head above the reservoir, a casing having a screw thread connection with the head, the said casing and head forming a receiving chamber provided with a liquid inlet, a sleeve having a screw thread connection with the casing extending upwardly therefrom, and provided with a removable closure at it upper end, a liquid-conducting tube passing through the head and removably engaged therewith, said tube having inlet openings communicating with the chamber, outlet openings communicating with the reservoir, and a valve seat below said inlet openings, a valve-carrying spindle movable endwise in the tube and projecting below the same, and a float movable in the reservoir and adapted to raise the spindle to close the valve, the spindle being movable by gravitation to open the valve.

In testimony whereof I have affixed my signature, in presence of two witnesses.

MONROE D. COLBATH.

Witnesses:
LESTER W. JENNEY,
C. F. BROWN.